(12) United States Patent
Kitahara et al.

(10) Patent No.: US 7,875,866 B2
(45) Date of Patent: Jan. 25, 2011

(54) BEAM RECORDING APPARATUS AND BEAM ADJUSTMENT METHOD

(75) Inventors: Hiroaki Kitahara, Tsurugashima (JP); Yasumitsu Wada, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 180 days.

(21) Appl. No.: 12/294,170

(22) PCT Filed: Mar. 23, 2007

(86) PCT No.: PCT/JP2007/056057

§ 371 (c)(1),
(2), (4) Date: Dec. 15, 2008

(87) PCT Pub. No.: WO2007/111260

PCT Pub. Date: Oct. 4, 2007

(65) Prior Publication Data

US 2009/0170017 A1 Jul. 2, 2009

(30) Foreign Application Priority Data

Mar. 24, 2006 (JP) ............................. 2006-082848

(51) Int. Cl.
*G11B 7/00* (2006.01)

(52) U.S. Cl. .................... 250/492.2; 369/101; 369/126; 369/44.27

(58) Field of Classification Search .............. 250/492.2, 250/492.1, 492.3; 369/101, 126, 44.27
See application file for complete search history.

(56) References Cited

U.S. PATENT DOCUMENTS

| | | | | |
|---|---|---|---|---|
| 4,018,987 | A | * | 4/1977 | Keizer .......................... 386/125 |
| 4,022,968 | A | * | 5/1977 | Keizer .......................... 386/125 |
| 6,549,293 | B2 | | 4/2003 | Hofman |
| 6,650,611 | B1 | * | 11/2003 | Kamimura et al. .......... 369/101 |

FOREIGN PATENT DOCUMENTS

| | | |
|---|---|---|
| JP | 09-190651 A | 7/1997 |
| JP | 2003-036548 A | 2/2003 |
| JP | 2003-317285 A | 11/2003 |
| TW | 200507065 A | 2/2005 |
| TW | 255426 B | 5/2006 |

OTHER PUBLICATIONS

Ryuichi Yamada, "Shin'endo Sokutei ni Okeru 2 Tenho Oyobi 3 Tenho no Yuyosei" (Availability of Two-point and Three-point Methods in Roundness Measurement), Journal of Japan Society for Design Engineering, 2001, pp. 137 to 142, vol. 36, No. 4.

(Continued)

*Primary Examiner*—Kiet T Nguyen
(74) *Attorney, Agent, or Firm*—Sughrue Mion, PLLC

(57) ABSTRACT

An electron beam recording apparatus includes: a displacement detection unit including at least three displacement sensors disposed at each different angle in a radial direction of the turntable; a shape calculation unit for calculating, based on the detected displacements by the at least three displacement sensors, shape data corresponding to displacements of side surface of the turntable in the radial directions; a rotation runout computing unit for computing, based on the shape data and at least one displacement detected by the at least three displacement sensors, rotation runout of the turntable including a rotation asynchronous component and a rotation synchronous component; and a beam irradiation position adjustment unit for adjusting an irradiation position of the electron beam based on the rotation runout.

15 Claims, 13 Drawing Sheets

OTHER PUBLICATIONS

Yamada, Ryuichi, "Availability of Two-Point and Three-Point Methods in Roundness Measurement," Journal of Japan Society for Design Engineering, Apr. 2001, pp. 137-142, vol. 36, No. 4.

Chou, Stephen Y., et al., "Imprint of Sub-25 nm Vias and Trenches in Polymers," Appl. Phys. Lett., Nov. 20, 1995, pp. 3114-3116, vol. 67, No. 21.

* cited by examiner

BEAM RECORDING APPARATUS AND BEAM ADJUSTMENT METHOD

CROSS REFERENCE TO RELATED APPLICATION

This application is a National Stage of International Application No. PCT/JP2007/056057 filed Mar. 23, 2007, claiming priority based on Japanese Patent Application No. 2006-082848, filed Mar. 24, 2006, the contents of all of which are incorporated herein by reference in their entirety.

BACKGROUND OF THE INVENTION

1. Field of the Invention

The present invention relates to an electron beam recording apparatus and the beam adjustment method and, more specifically, to an electron beam recording apparatus and the beam adjustment method therefor that uses the electron beam to manufacture a master of a high-speed-rotating recording medium such as magnetic disk.

2. Description of the Related Art

A beam recording apparatus performs lithography using an exposure beam such as electron beam and laser beam, and is widely used in an apparatus for manufacturing a master of a large-capacity disk, e.g., optical disk including digital versatile disc (DVD), Blu-ray disc, or others, and a magnetic recording medium such as a hard disk.

In such a beam recording apparatus, a resist layer is formed on the recording surface of a substrate which is to be a master for manufacturing the disks exemplified above. The beam recording apparatus then rotates and translates the substrate to direct, as appropriate, a spot beam to the recording surface in, relatively, the radial and tangential directions. Using a spot beam as such, the beam recording apparatus performs control to form a latent image on the resist layer with a spiral or concentric track rendered on the recording surface of the substrate.

In such a beam recording apparatus, however, rotation runout occurs depending on the mechanical precision of a transfer motor, a spindle motor, and others, rotating and translating the substrate, and the rotation runout reduces the precision of track formation. It is needed to take some correction for such rotation runout during beam exposure or recording.

The rotation runout of a disk substrate includes, as is well known, synchronous runout (synchronous rotation runout) and asynchronous runout (asynchronous rotation runout). The synchronous runout is of a runout component in synchronism with the rotation frequency of a turntable, i.e., substrate, and the asynchronous runout is not dependent on the rotation frequency of the turntable, i.e., substrate, and occurs irregularly.

About the asynchronous rotation runout, Patent Document 1 (Japanese Patent Application Kokai No. H09-190651, page 4, FIG. 1) describes the correction technology in an exposure apparatus for an optical disk master, for example. The technology in Patent Document 1 is for correcting the problem of asynchronous rotation runout with an object of improving the track pitch accuracy, i.e., relative position accuracy with adjacent tracks, in the exposure apparatus for an optical disk master.

Unlike the asynchronous rotation runout, although reducing the roundness accuracy of the track, i.e., absolute accuracy, the synchronous rotation runout does not affect the track pitch accuracy. With an optical disk, because the roundness error caused by the synchronous rotation runout can be followed by a tracking servo of a disk reproducing apparatus, the synchronous rotation runout has not been perceived as a problem that much as the asynchronous rotation runout. However, there is the recent demand for creating a magnetic recording medium using an electron beam exposure apparatus because of the high recording densities of a hard disk being the magnetic recording medium. The magnetic recording medium is the one called discrete track medium or patterned medium.

The hard disk is high in rotation speed at data recording and reproduction, and the control band is narrow in a swing-arm control mechanism for use to perform track control over the recording reproducing head. The disk medium is thus strictly required to be high in track roundness accuracy. As such, the master exposure apparatus for manufacturing such a disk medium has to be capable of correcting, with high accuracy, not only asynchronous rotation runout but also synchronous rotation runout.

Patent Document 2 (Japanese Patent Application Kokai No. 2003-317285, pages 7 to 8, FIG. 3) and Patent Document 3 (Japanese Patent Application Kokai No. 2003-36548, page 8, FIG. 6) describe the technology for correcting both asynchronous rotation runout and synchronous rotation runout. With the technology, the recording beam position is controllably corrected based on information being an earlier measurement result about the displacement of a turntable in the radial direction.

In the Patent Document 2 is, for example, it is described about the technology for performing control over (correcting) the position to which a recording beam is irradiated based on the computation result of a displacement difference between reference displacement and radial displacement of a turntable. The reference displacement is in the radial direction and measured with a predetermined rotation speed or slower. The radial displacement is the displacement in the radial direction measured in real time during beam exposure. In this method, however, used as a reference is the displacement at the low rotation speed on the assumption that the synchronous component of the rotation runout is small at the low rotation speed, and the synchronous component is increased in proportion to the increase of the rotation speed.

The problem here is that the rotation synchronous component cannot be neglected even at low-speed rotation, and the rotation synchronous component is not necessarily increased in proportion to the increase of the rotation speed. As such, with the above methods, there is no way of knowing the synchronous rotation runout component observed during the rotation of capturing a reference displacement waveform, and thus no runout correction is possible.

In order to keep up with the high recording densities of a magnetic recording medium, e.g., discrete track medium or patterned medium, rotated at high speed for data recording and reproduction, there needs to correct not only the asynchronous rotation runout but also the synchronous rotation runout with considerably high accuracy. That is, the previous correction methods do not serve well enough for the synchronous rotation runout in such a magnetic disk or others, and no true rotation synchronous component can be completely corrected thereby. Such problems and objects have not been recognized.

SUMMARY OF THE INVENTION

An object on the invention is to provide, as an example, an electron beam recording apparatus that is capable of correcting not only asynchronous rotation runout but also synchronous rotation runout with considerably high accuracy.

An aspect of the invention is directed to an electron beam recording apparatus for emitting an electron beam toward a substrate while rotating a turntable with the substrate placed thereon. The electron beam recording apparatus includes: a displacement detection unit including at least three displacement sensors disposed at each different angle in a radial direction of the turntable; a shape calculation unit for calculating, based on the detected displacements by the at least three displacement sensors, shaped at a corresponding to displacements of side surface of the turntable in the radial directions; a rotation runout computing unit for computing, based on the shape data and at least one displacement detected by the at least three displacement sensors, rotation runout of the turntable including a rotation asynchronous component and a rotation synchronous component; and a beam irradiation position adjustment unit for adjusting an irradiation position of the electron beam based on the rotation runout.

An another aspect of the invention is directed to a computing method of a rotation runout in an electron beam recording apparatus for emitting an electron beam toward a substrate while rotating a turntable with the substrate placed thereon. The method includes: a displacement detecting step of detecting displacements in at least three different angles in radial directions of the turntable; a shape calculating step of calculating, based on the detected displacements in the at least three different angles, shape data corresponding to displacements of side surface of the turntable; and a rotation runout computing step of computing, based on the shape data and at least one displacement of the at least three different angles rotation runout of the turntable including a rotation asynchronous component and a rotation synchronous component.

An further another aspect of the invention is directed to a method of adjusting the electron beam using the computing method of a rotation runout. The method of adjusting the electron beam includes a beam irradiation position adjusting step of adjusting an irradiation position of the electron beam based on the rotation runout.

MODE FOR CARRYING OUT THE INVENTION

Figure 1:
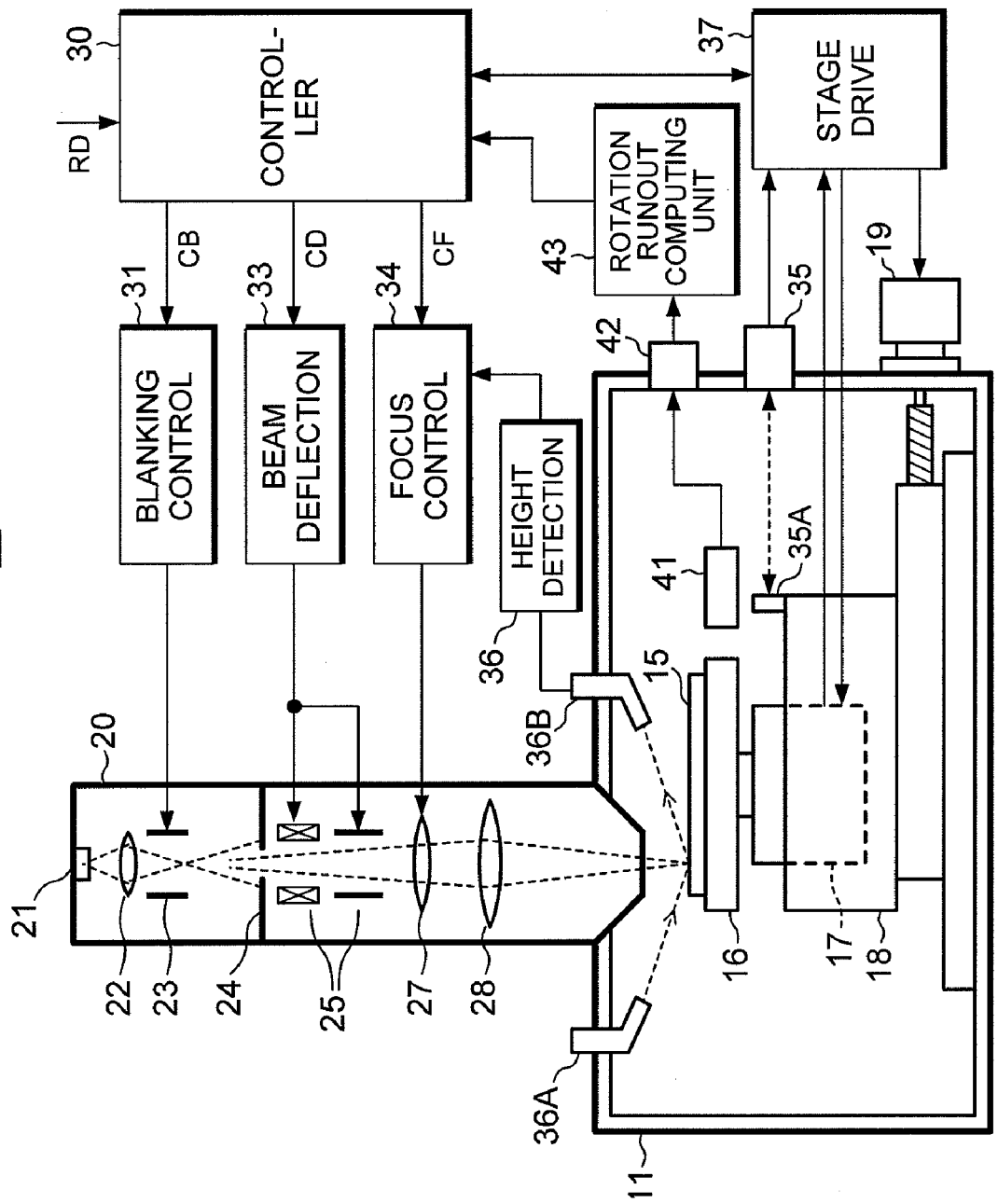
FIG. 1 is a schematic block diagram showing the configuration of an electron beam recording apparatus in an embodiment of the invention.

In the below, embodiment of the present invention is described in detail by referring to the accompanying drawings. Note that, in the embodiment below, any equivalent components share the same reference numeral.

FIG. 1 is a schematic block diagram showing the configuration of an electron beam recording apparatus 10 in the embodiment of the present invention. The electron beam recording apparatus 10 is a disk mastering apparatus that creates a master for manufacturing a hard disk using an electron beam.

[Configuration and Operation of Electron Beam Recording Apparatus]

The electron beam recording apparatus 10 is configured to include a vacuum chamber 11, a drive device, an electron beam column 20, and various types of circuit and control system for drive-controlling a substrate 15, and controlling the electron beam, for example. The drive device serves to drive, to place, rotate and translate, the substrate 15 disposed in the vacuum chamber 11, and the electron beam column 20 is attached to the vacuum chamber 11.

More in detail, the substrate 15 for use for a disk master is coated with a resist on the surface, and is disposed on a turntable 16. The turntable 16 is driven to rotate by a spindle motor 17 about a vertical axis of the main surface of the disk substrate. The spindle motor 17 serves to drive the substrate 15 to rotate, and is disposed on a transfer stage (hereinafter, referred to also as X stage) 18. The X stage 18 is coupled to a transfer motor 19 serving to transfer, i.e., drive to translate or move, the substrate 15, and thereby, the spindle motor 17 and the turntable 16 are allowed to move in a predetermined direction, i.e., x direction, in the plane parallel to the main surface of the substrate 15. As such, an X$\theta$ stage is configured by the X stage 18, the spindle motor 17, and the turntable 16.

The spindle motor 17 and the X stage 18 are driven by a stage drive section 37, and the drive amount thereof, i.e., the transfer amount (or move amount) of the X stage 18 and the rotation angle of the turntable 16, i.e., the substrate 15, is controlled by a controller 30.

The turntable 16 is made of a dielectric material, e.g., ceramic, and including an electrostatic chucking mechanism (not shown) for keeping hold of the substrate 15, for example. With the chucking mechanism as such, the substrate 15 disposed on the turntable 16 is securely fixed to the turntable 16.

The X stage 18 carries thereon a reflective mirror 35A, which is a part of a laser interferometer 35.

The vacuum chamber 11 is disposed via a vibration isolation pad such as air dumper (not shown), and the vibration coming from outside is prevented from being transferred thereof. The vacuum chamber 11 is connected with a vacuum pump (not shown) for evacuation of the vacuum chamber 11 so that the vacuum chamber 11 has a vacuum atmosphere of a predetermined pressure.

The electron beam column 20 is provided therein with, in this order, an electron gun, i.e., emitter 21 that emits an electron beam, a converging lens 22, a blanking electrode 23, an aperture 24, a beam deflection electrode 25, a focus lens 27, and an objective lens 28.

The electron gun 21 emits an electron beam (EB) accelerated by several tens of Kev, for example, by a cathode (not shown) for application of a high voltage coming from an acceleration high-voltage power supply (not shown). The converging lens 22 converges the emitted electron beam. The blanking electrode 23 performs ON/OFF switching control (ON/OFF control) over the electron beam based on a modulation signal coming from a blanking control section 31. That is, the voltage is applied between the blanking electrodes 23 so that the electron beam passing therethrough are deflected to a considerable degree. This favorably stops the electron beam not to pass through the aperture 24 so that the electron beam can be put in the OFF state.

The beam deflection electrode 25 can perform deflection control, at high speed, over the electron beam based on a control signal coming from a beam deflection section 33. Through such deflection control, the position of an electron spot beam is controlled with respect to the substrate 15. The focus lens 28 is driven based on a drive signal coming from a focus control section 34 so that the electron beam is subjected to focus control.

The vacuum chamber 11 is provided with a height detection section 36 for detecting the surface height of the substrate 15. A light detection unit 36B includes a position sensor, a CCD (Charge Coupled Device), or others. The light detection unit 36B receives a light beam, and forwards a reception signal to the height detection section 36. The light beam is the one emitted from a light source 36A, and is reflected on the surface of the substrate 15. Based on the reception signal, the height detection section 36 detects the surface height of the substrate 15, and generates a detection signal representing the surface height of the substrate 15. The detection signal is then forwarded to the focus control section 34, and based on the detection signal, the focus control section 34 performs focus control over the electron beam.

The laser interferometer 35 measures the displacement the X stage 18 observed using a laser light coming from a light source in the laser interferometer 35. The measurement result data, i.e., the transfer (X direction) position data of the X stage 18, is then forwarded to the stage drive section 37.

A rotation signal of the spindle motor 17 is also forwarded to the stage drive section 37. More in detail, the rotation signal includes a data signal representing the reference rotation position of the substrate 15, and a pulse signal, i.e., rotary encoder signal, for every predetermined rotation angle with respect to the reference rotation position. From such a rotation signal, the stage drive section 37 can derive the rotation angle and speed of the turntable 16, i.e., the substrate 15.

The stage drive section 37 generates position data based on the transfer position data from the X stage 18 and the rotation signal from the spindle motor 17, and forwards the position data to the controller 30. The position data represents the position of an electron spot beam on the substrate. Based on a control signal coming from the controller 30, the stage drive section 37 drives the spindle motor 17 and the transfer motor 19 for rotation or transfer drive.

The controller 30 is provided with track pattern data and data for recording (beam exposure), i.e., recording data, RD, which are used for discrete track media, patterned media, and others.

The controller 30 sends out signals to the blanking control section 31, the beam deflection section 33, and the focus control section 34, respectively. The signals include a blanking control signal CB, a deflection control signal CD, and a focus control signal CF. Through such signal sending-out, the controller 30 performs control over data recording (beam exposure or image rendering) based on the recording data RD. That is, based on the recording data RD, an electron beam (EB) is irradiated to the resist layer on the substrate 15, and a latent image is formed only to the portion exposed to the electron beam so that data recording (beam exposure) is performed.

The electron beam recording apparatus 10 is provided with a displacement detection device 41 for detecting the displacement in the radial direction of the rotating turntable 16. More in detail, the turntable 16 is shaped like a cylinder, and on the main surface, i.e., the main plane, the substrate is disposed. The turntable 16 is driven to rotate about its own center axis, and the displacement detection device 41 detects the displacement observed in the side surface of the turntable 16 in the radial direction. As will be described later, the displacement detection device 41 is configured by at least three displacement sensors. Additionally, a measured portion is not limited to the side surface of the turntable 16. The portion which is rotated in one piece with the turntable 16 can be regarded as a portion of the turntable 16 and can be used for the measurement of the displacement. For example, the side surface of the rotating shaft for the turntable 16 can be used as the measured portion by the displacement sensor.

The displacement detected by the displacement detection device 41, i.e., detected displacement, is forwarded to a rotation runout computing unit 43. As an alternative configuration, an amplifier device 42 may be provided for use to amplify the detection signal, and thus amplified detection signal may be forwarded from the amplifier device 42 to the rotation runout computing unit 43.

In the rotation runout computing unit 43, the detected displacement is subjected to a predetermined computation so that the rotation runout is calculated. Thus calculated rotation runout is then supplied to the controller 30. Based on the rotation runout being the calculation result, the controller 30 performs control over the beam deflection section 33, and adjusts (corrects) the position where the electron beam is irradiated.

Such recording control is performed based on the transfer position data and the rotation position data described above. Note that, described above are the main signal lines for the components, i.e., the blanking control section 31, the beam deflection section 33, the focus control section 34, and the stage drive section 37. Between these components and the controller 30, a two-way connection is each established so that any needed signal can be exchanged therebetween.

[Calculation of Roundness Error, and Detection and Computation of Rotation Runout]

By referring to the accompanying drawings, described now in detail is the configuration and operation of the electron beam recording apparatus 10, detecting and computing the rotation runout, and adjusting the beam irradiation position based on the resulting rotation runout.

Figure 2:
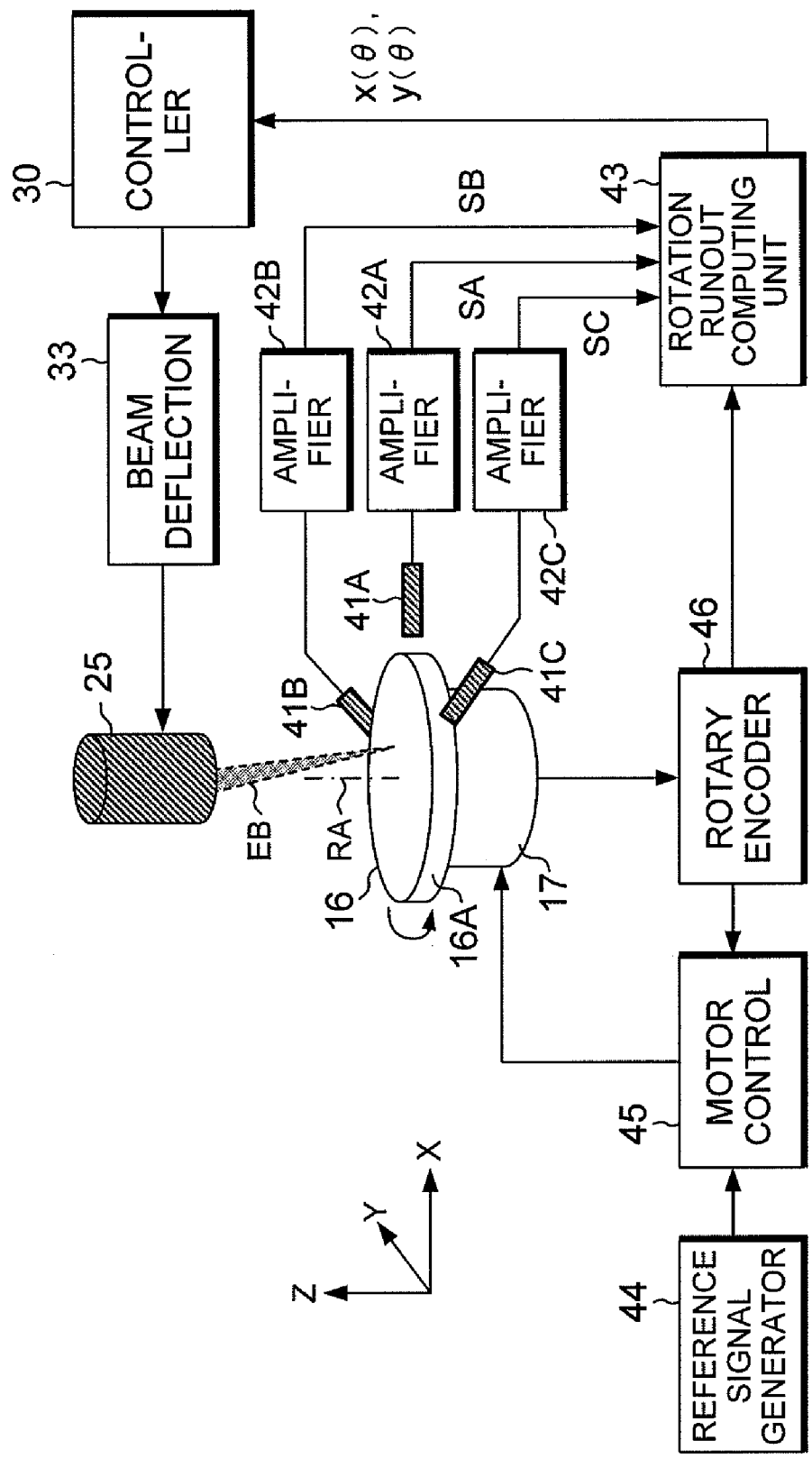
FIG. 2 is a diagram showing the configuration of detecting and computing rotation runout, and adjusting the irradiation position of an electron beam (EB) based on the computation result.

FIG. 2 is a diagram showing the configuration of detecting and computing the rotation runout, and adjusting the irradiation position of electron beam (EB) based on the computation result.

The turntable 16 carries the substrate 15 (not shown) on the main surface, i.e., xy-plane, and as shown in FIG. 2, is rotated about its own center axis, i.e., z direction: indicated as rotation center axis RA, by the spindle motor 17. A side surface 16A of the turntable 16 is shaped like a cylinder.

The spindle motor 17 rotating the turntable 16 is controlled by a motor control circuit 45 for rotation thereof. The motor control circuit 45 operates based on a reference signal from a reference signal generation unit 44, and a rotary encoder signal from the rotary encoder 46. The rotary encoder signal from the rotary encoder 46 is supplied to the rotation runout computing unit 43.

The rotation runout computing unit 43 operates using the rotary encoder signal as a reference clock. That is, the rotation runout computing unit 43 operates at the timing with reference to the rotation angle of the turntable 16 based on the rotary encoder signal.

First of all, the rotation runout computing unit 43 previously calculates the shape of the side surface of the turntable 16 being a measuring cylindrical surface, i.e., the shape waveform data $r(\theta)$, and the roundness error. The shape waveform data $r(\theta)$ represents the waveform with respect to the rotation angle $\theta$ of the turntable 16, and the roundness error represents an error from a perfect circle for the side surface of the turntable 16. The roundness error (Ec) can be represented as below.

$Ec(\theta)=r(\theta)-r0$, where the radius of the perfect circle is $r0$.

To calculate the shape waveform data $r(\theta)$ and the roundness error (Ec), there is a computation method designed on the principle of a three-point roundness measurement method. (hereinafter, also referred to simply as three-point method). The details of the principle of the three-point roundness measurement method are found in Non-Patent Document "Transactions of Japan Society of Mechanical Engineers C, Vol. 48, No. 425, pp. 115 (1982-1)", for example. In the below, described are the displacement sensor for use to measure the shape waveform data $r(\theta)$, and the computation of rotation runout.

As shown in FIG. 2, around the side surface 16A of the turntable 16, three displacement sensors 41A, 41B, and 41C each being the displacement detection device 41 are disposed, i.e., first, second, and third displacement sensors. These first to third displacement sensors 41A, 41B, and 41C detect the displacements of the side surface (cylindrical surface) 16A of the rotating turntable, i.e., the displacements of the rotating turntable in the radial direction. The side surface 16A is hereinafter referred to simply as cylindrical surface 16A, and the displacement in the radial direction is referred to also as radial displacement. Signals detected by the displacement sensors 41A, 41B, and 41C are respectively amplified by first to third amplifiers 42A, 42B, and 42C configuring the amplifier device 42. The resulting amplified signals are forwarded to the rotation runout computing unit 43 as first to third displacement detection signals SA, SB, and SC.

The displacement sensors 41A, 41B, and 41C detect the radial displacements of the side surface 16A of the turntable using an optical or electrical method, and others. For example, the displacement sensors 41A, 41B, and 41C are each configured as a laser interferometer, and have enough detection accuracy compared with that of the beam exposure, e.g., detection accuracy of sub-nanometer, i.e., 1 nm or lower. Such an optical method as using a laser interferometer is not the only possibility, and any other methods may be used for detection, e.g., displacement gage of an electrostatic capacity type may be used for detecting the radial displacement based on a change of electrostatic capacity.

Figure 3:
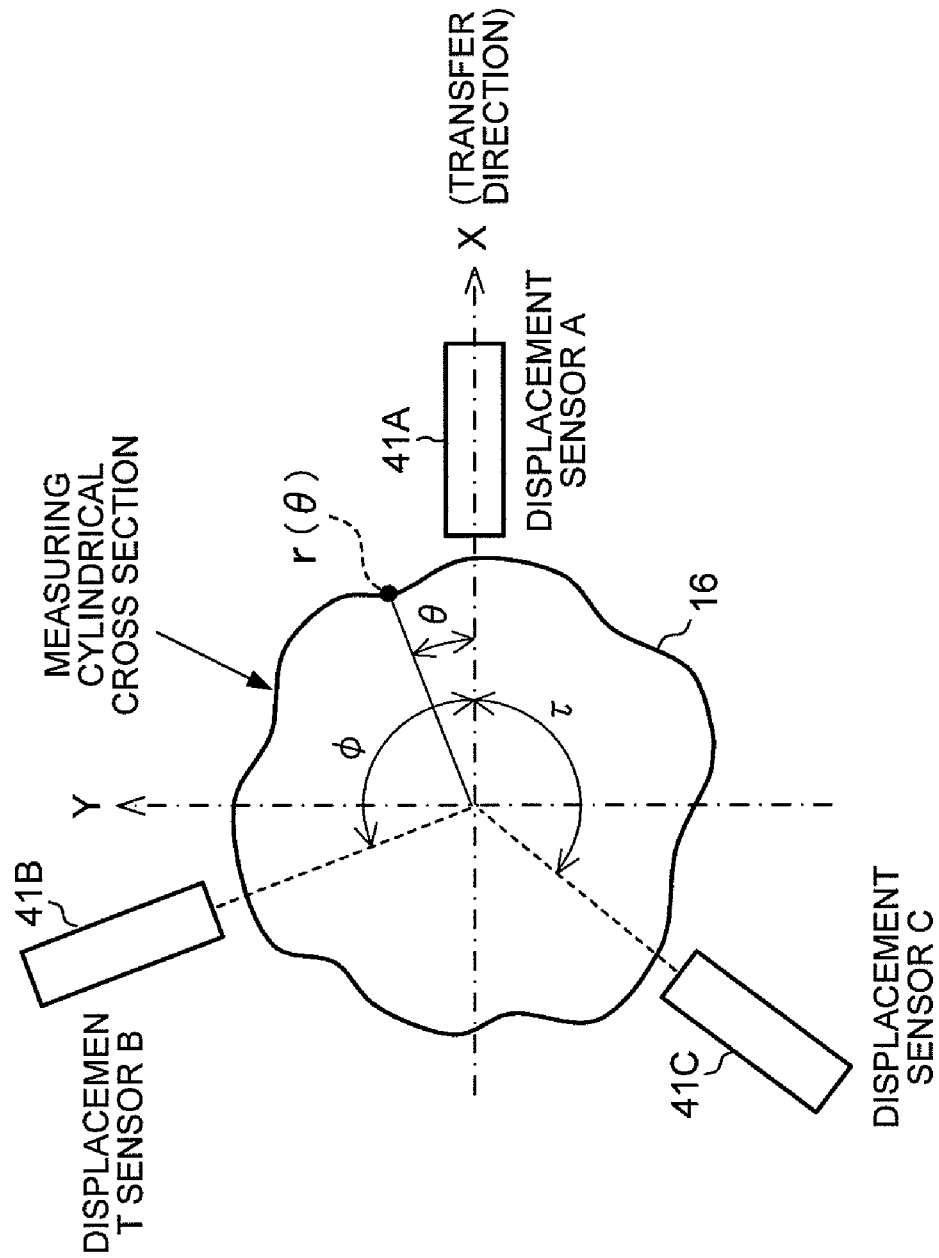
FIG. 3 is a top view of a turn table and three displacement sensors, showing their layout.

FIG. 3 is a schematic top view of the turntable 16 and the displacement sensors 41A, 41B, and 41C, showing their layout.

The displacement sensor 41A is disposed in the X-direction. The displacement sensor 41B is so disposed as to form an angle $\phi$ with respect to the displacement sensor 41A, and the displacement sensor 41C is so disposed as to form an angle $(2\pi-\tau)$ with respect to the displacement sensor 41C ($\phi$, $\tau>0$). With the rotation angle $\theta$ with reference to the direction of the displacement sensor 41A, i.e., X-direction, the shape of the cylindrical surface 16A being a measurement target can be represented as $r(\theta)$ using a polar coordinate system.

The spindle motor 17 is rotated to measure the measuring cylindrical surface 16A for the radial displacement. The radial displacement signals $SA(\theta)$, $SB(\theta)$, and $SC(\theta)$ coming from the displacement sensors 41A, 41B, and 41C, respectively, are forwarded to the rotation runout computing unit 43. Herein, the direction away from the sensors is positive. These radial displacement signals are subjected to sampling with a trigger of pulse coming from the rotary encoder 46, and then to digital/analog (D/A) conversion. At this time, if required, a process of filtering or averaging may be performed, for example.

Figure 4A:
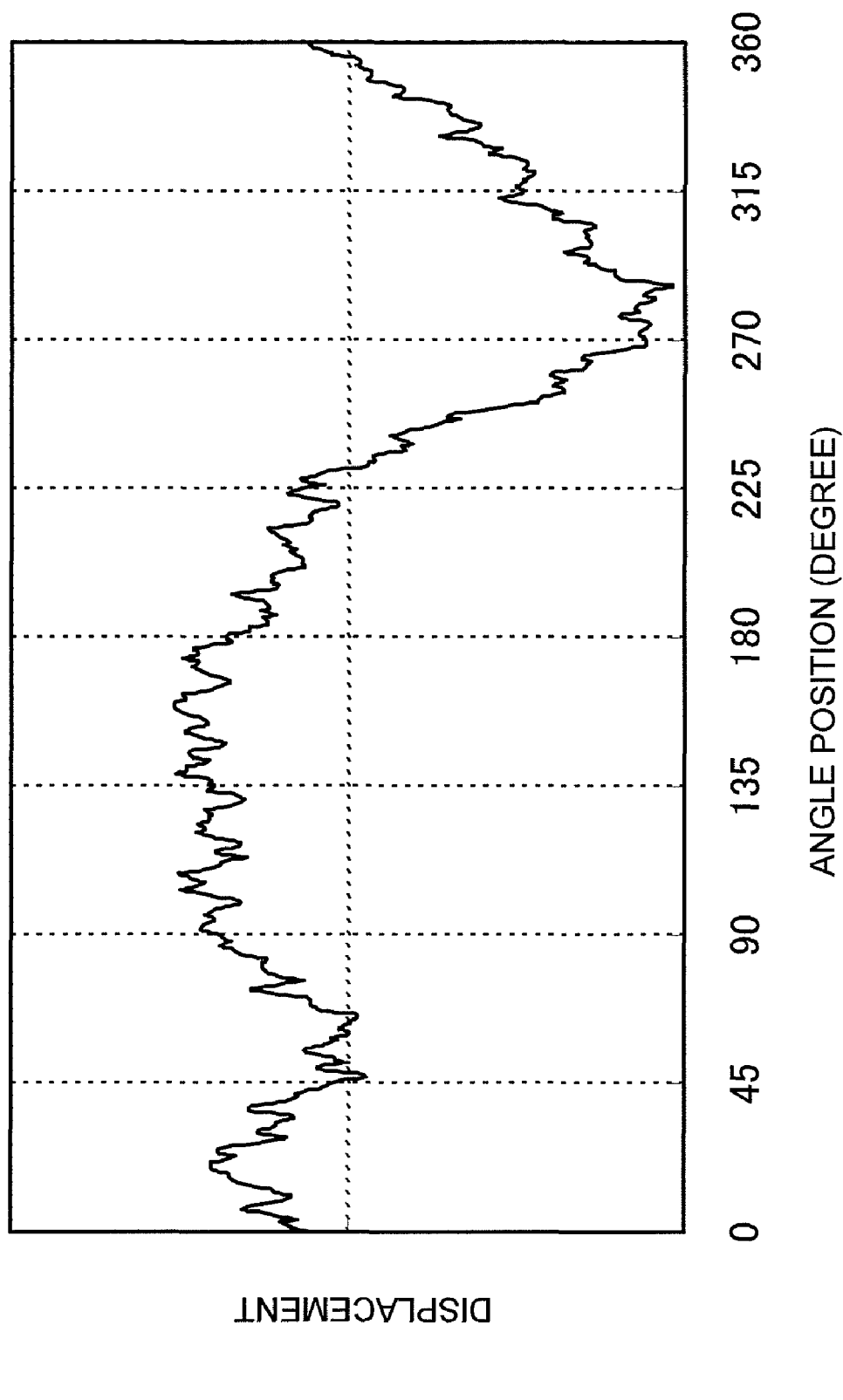
FIG. 4A is a diagram showing an exemplary radial displacement waveform with respect to a rotation angle ($\theta$) of the turntable.
Figure 4B:
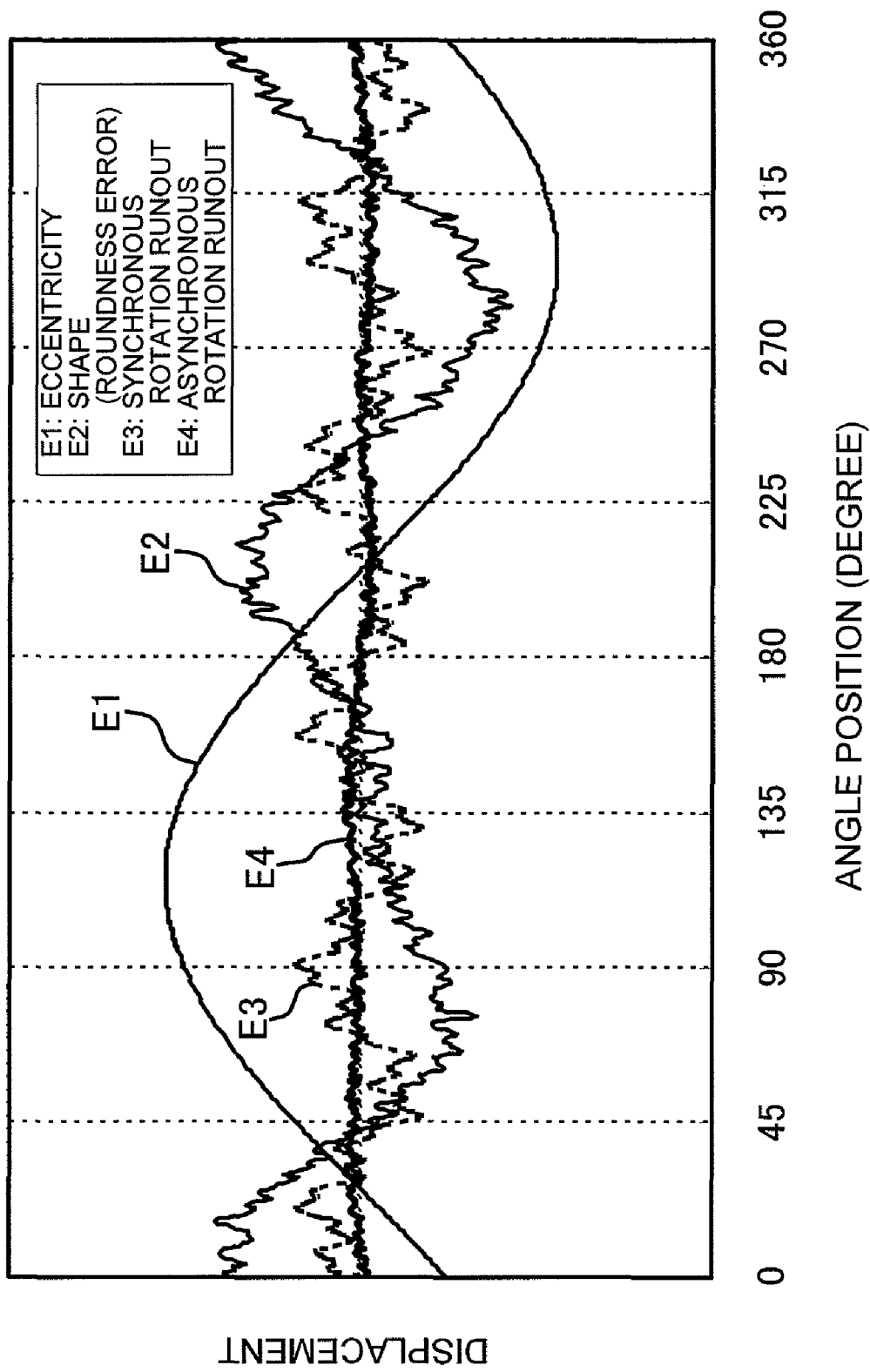
FIG. 4B is a diagram showing the radial displacement waveform being separated into components.

FIG. 4A shows an exemplary waveform of radial runout with respect to the rotation angle ($\theta$) of the turntable 16. This radial runout waveform is separated into components, and the separation result looks like FIG. 4B, showing waveforms on a component basis. The radial runout of the turntable 16 includes components of E1 to E4. That is, E1 is a displacement component caused by eccentricity of the rotation axis, E2 is a shape displacement component ($E2=Ec(\theta)$: roundness error) caused by the shape of the side surface 16A of the turntable 16, E3 is a displacement component caused by synchronous rotation runout, and E4 is a displacement component caused by asynchronous rotation runout.

The displacement component E1 by eccentricity and the shape displacement component E2 are those caused by the roundness error and the attachment eccentricity, which are originally observed in the turntable 16. The components E1 and E2 each have a constant waveform showing no change irrespective of the rotation frequency. On the other hand, the synchronous rotation runout component E3 is synchronous with the rotation frequency, and generally changes depending on the rotation frequency (i.e., Fourier component changes). The asynchronous rotation runout component E4 is an irregular runout component not synchronous with the rotation frequency.

Figure 8:
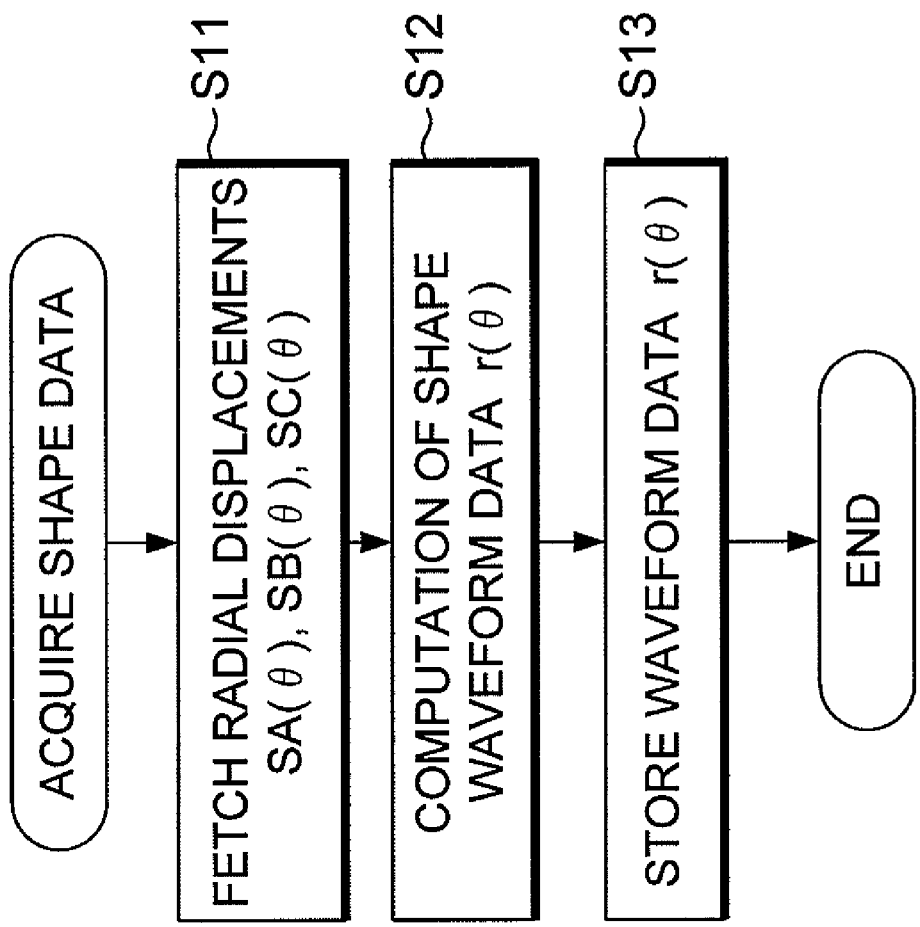
FIG. 8 is a flowchart showing the procedure of computing the shape waveform data $r(\theta)$ using the displacement signals $SA(\theta)$, $SB(\theta)$, and $SC(\theta)$ and stores the computed shape waveform.

As shown in the flowchart of FIG. 8, the rotation runout computing unit 43 fetches, in advance, the radial displacement signals $SA(\theta)$, $SB(\theta)$, and $SC(\theta)$ (step S11). Then, the rotation runout computing unit 43 computes the shape waveform data $r(\theta)$ of the measuring cylindrical surface by the three-point roundness measurement method based on the radial displacement signals (step S12). Herein the shape waveform data $r(\theta)$ derived by the three-point roundness measurement method includes no first-order Fourier component, i.e., eccentricity component E1. Therefore, the shape waveform data $r(\theta)$ derived by the three-point roundness measurement method is, strictly speaking, the roundness error waveform $Ec(\theta)$.

The shape waveform data $r(\theta)$ derived as such is stored in a memory such as RAM provided in the rotation runout computing unit 43 or others (step S13).

Figure 9:
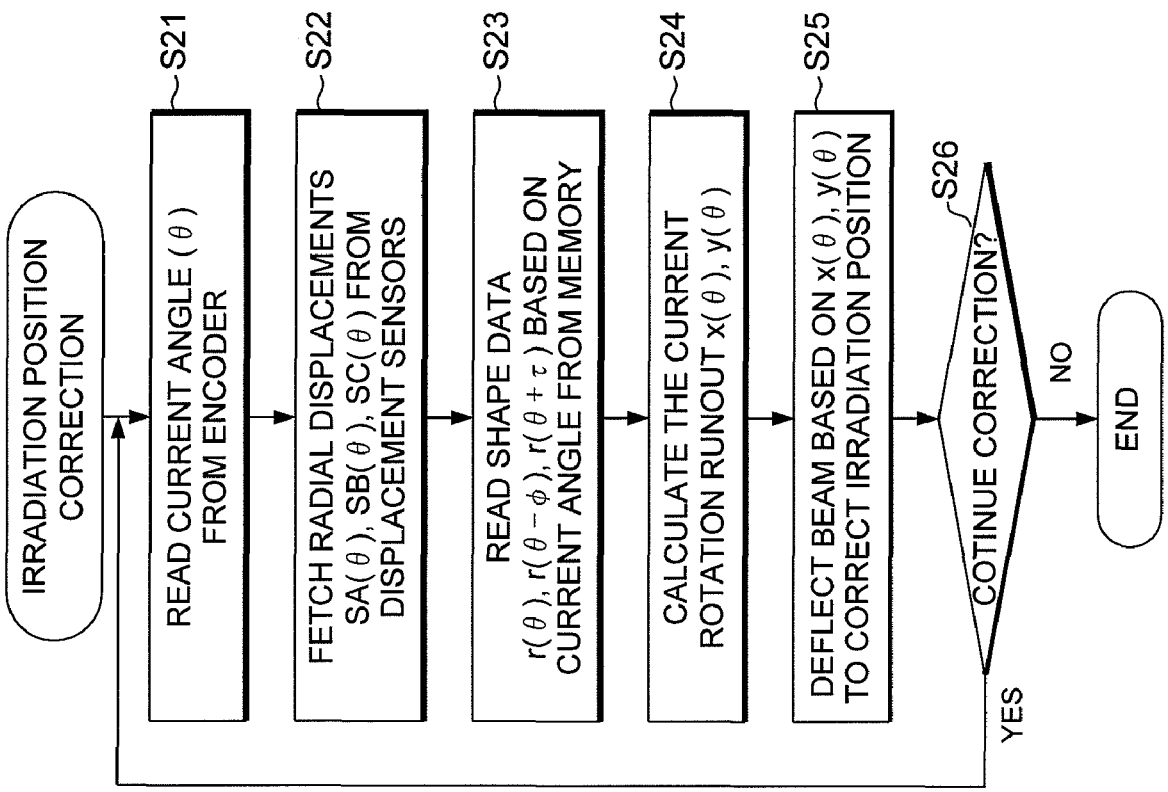
FIG. 9 is a flowchart showing the procedure in which the shape waveform data $r(\theta)$ is measured prior to performing recording (exposure), then correction (adjustment) is performed.

By referring to FIG. 5 and the flowchart of FIG. 9, described next is a case where the rotation runout computing unit 43 adjusts the beam irradiation position based on the shape waveform data r(θ) already stored in the memory at the time of beam exposure. Stated in another way, description will be made in a case where the shape waveform data r(θ) is measured prior to performing beam exposure (drawing), then correction (adjustment) is performed.

The shape waveform data r(θ) is stored in a memory (RAM) 48. The rotation runout computing unit 43 reads out the rotation angle (θ) (i.e., rotary encoder signal) from the rotary encoder 46 (FIG. 2), the rotation angle (θ) being the current angle (step S21, FIG. 9). The measurement radial displacement data, that is, current displacements SA(θ), SB(θ), and SC(θ) are fetched from the displacement sensors 41A, 41B, and 41C (or after being amplified by the amplifiers 42A, 42B, and 42C) (step S22), and the current displacements are supplied in real time to the subtractor 49. The shape waveform data r(θ), r(θ−φ) and r(θ+τ) stored in the memory (RAM) 48 are read out based on the current angle (θ) (step S23), and supplied to the subtractor 49 provided in the rotation runout computing unit 43. Then, the shape waveform data r(θ) is subtracted from the current displacements SA(θ), SB(θ), SC(θ) in the subtractor 49.

The rotation runout computing unit 43 goes through computation such as subtraction using the high-speed processing means, e.g., DSP (Digital Signal Processor). As such, the rotation runout computing unit 43 calculates, in real time at high speed, the waveform data, that is current rotation runout x(θ) and y(θ) for the two-dimensional rotation runout component in the X and Y directions (step S24). The waveform data x(θ) and y(θ) are represented as below.

$$x(\theta)=r(\theta)+S_A(\theta)$$

$$y(\theta)=[\{S_B(\theta)r(\theta-\phi)\}\cos\tau-\{S_B(\theta)+\tau(\theta+\tau)\}\cos\phi]/\sin(\theta+\tau)$$

The waveform data x(θ) and y(θ) derived as such is supplied to the controller 30. Based on the waveform data (rotation runout data) x(θ) and y(θ) calculated as such, the controller 30 performs control over the beam deflection section 33, and adjusts (corrects) in real time the irradiation position of the electron beam (EB) (step S25). That is, by changing the irradiating position of the exposure beam, i.e., electron beam, based on the rotation runout signal, the recording position is accordingly corrected. This enables to implement the beam exposure to a concentric circle with satisfactory roundness accuracy and a spiral pattern free from influence of synchronous and asynchronous rotation runout of the spindle motor 17 with less track runout and track pitch variation. When it is determined that the correction control is continued, the procedure steps are repeated from step S21 (step S26).

Note that correction of the rotation runout in one direction can be performed. In this case, it is advantageous for the controller 30 and the like, since the controller 30 can be operated under lower load of computation for the simplified correction. For example, correction of the runout in x-direction can be performed. In the example, the current displacement SA(θ) and the current waveform data r(θ) of the current angle (θ) are read out from the displacement sensor and the memory 48, respectively, so that the current rotation runout (i.e., the runout in x-direction) x(θ) can be calculated. Accordingly, the beam deflection correction is performed based on the current rotation runout x(θ).

The waveform data x(θ) and y(θ) includes no radial displacement component of the shape waveform, i.e., E2=Ec(θ) in FIG. 4, and represents the rotation asynchronous and synchronous components of the true rotation runout, i.e., E1, E3, and E4 of FIG. 4. That is, as described above, in the previous technology, at the time of capturing the reference displacement waveform, thus captured reference displacement waveform is including the synchronous rotation runout component at rotation with low speed. The synchronous rotation runout component is thus considered negligible when the substrate is actually rotated during beam exposure, and a difference is corrected. The true rotation frequency component cannot be thus completely corrected.

As to the synchronous rotation runout, the first-order component in a case where some off center is observed is proportional to the square of the rotation speed. The component of second-order or higher shows some complicated change related to the resonance frequency of a rotation system. As such, the rotation synchronous component is not necessarily proportional to the rotation speed, and even if it is corrected in proportion to the rotation speed, the rotation synchronous component cannot be completely corrected.

In the embodiment, however, it is possible to completely correct not only the rotation asynchronous component of the rotation runout but also the true rotation synchronous component thereof. The rotation asynchronous and synchronous components are actually changed depending on the rotation speed of the turntable 16, i.e., the substrate 15. Accordingly, in a case where beam exposure is performed while changing the rotation speed, e.g., beam exposure with CLV (Constant Line Velocity), the electron beam (EB) can be adjusted by irradiation position while the rotation runout is being corrected in real time with considerably high accuracy. Moreover, the rotation runout not including the shape waveform component or the radial displacement components (E1, E3, and E4) sometimes shows incessant change due to the change of apparatus state such as apparatus environment or interference. In the embodiment, irrespective of such a change, the irradiation position can be adjusted for the electron beam in real time with considerably high accuracy. Therefore, even with the light exposure with the fixed rotation speed, e.g., with CAV (Constant Angular Velocity), it is possible to adjust, in real time with considerably high accuracy, the irradiation position of the electron beam.

In the embodiment, used are the displacement sensors 41A to 41C each having the measurement sensitivity of sub-nanometer. An adjustment mechanism may be additionally provided for adjusting the position (height) of the displacement sensors 41A to 41C to prevent an error to the attachment height of the sensors, i.e., measurement height of the radial displacement. For example, the height adjustment mechanism adjusts the position, i.e., height, of the displacement sensors 41A to 41C in such a manner that the error of the shape waveform data r(θ) falls within a predetermined range when the controller 30 acquires the shape waveform data r(θ).

The displacement sensors are not restrictive to the disposition direction of FIG. 3, and may be disposed in any directions. Herein, some combinations of the relative angles φ and τ of the displacement sensors 41A to 41C may cause computation divergence, and generate Fourier series components not available for detection. It is thus desirable to place the displacement sensors at a relative angle that allows detection of Fourier components up to higher order.

When a disk master is exposed to the beam, the track roundness error is actually affected, dominantly, by the rotation runout component in the X direction, i.e., the radial direction of the turntable 16, i.e., substrate 15, and the transfer direction of the stage. It is thus desirable to dispose one of the three displacement sensors 41A to 41C in the X direction. If this is the case, there is no need to go through complicated subtraction in the X direction, thereby leading to advantages of simplifying the computation process at the time of correction.

Figure 6:
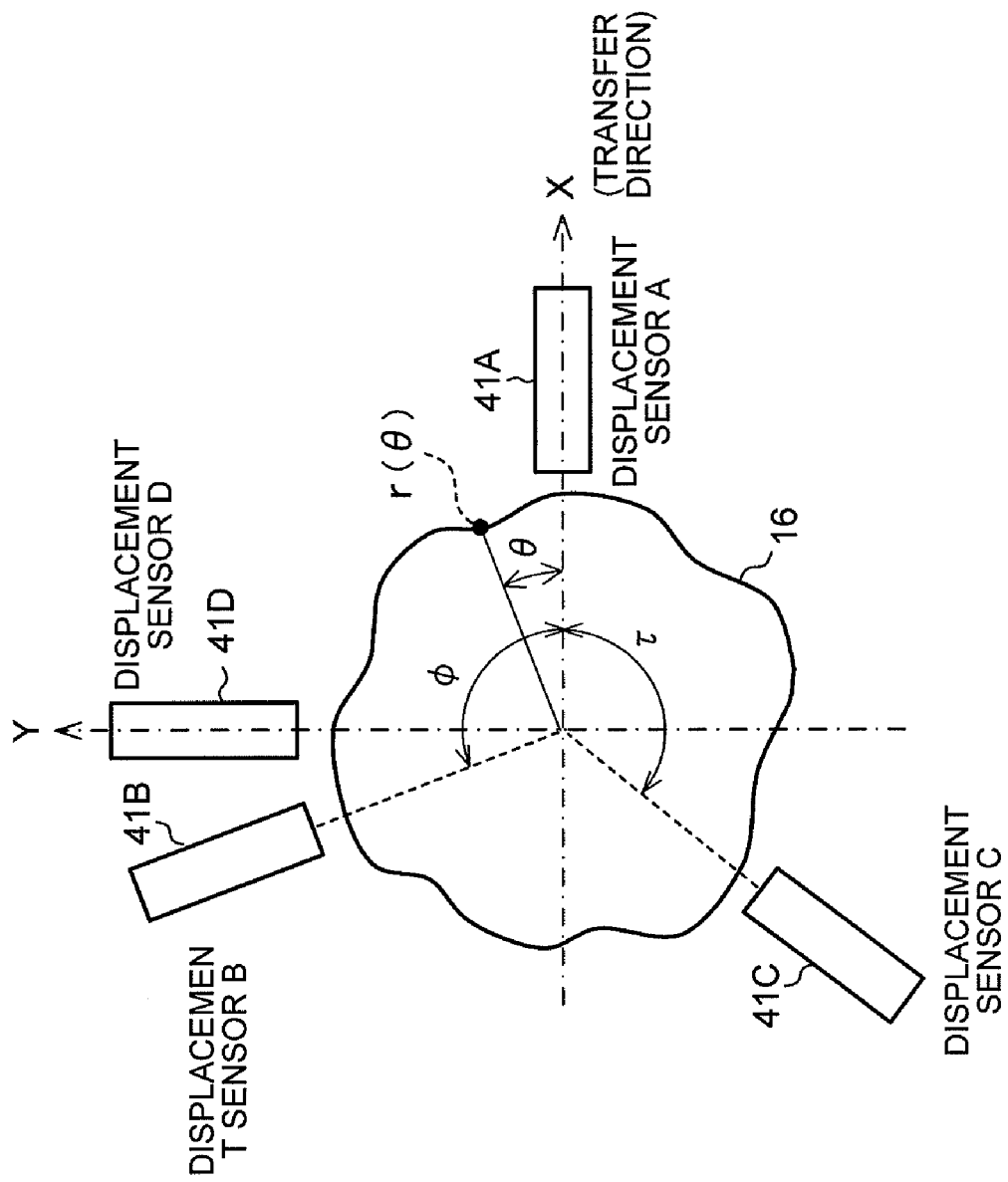
FIG. 6 is a schematic top view of four displacement sensors, showing their layout, i.e., a modified example of the invention.

Alternatively, as shown in FIG. 6, four displacement sensors 41A to 41D may be used, and two of these may be disposed in the X direction (the displacement sensor 41A)

and Y direction (the displacement sensor 41D), respectively. The remaining two sensors are each disposed at an angle causing no computation divergence in a range up to any needed orders of Fourier with displacement measurement with a three-point method. With such a disposition, the real-time computation during beam exposure can be simplified, and the speed therefor can be increased.

In the above-described embodiment, exemplified is the case of adjusting the irradiation position of the exposure beam using the rotation runout waveform data $x(\theta)$ and $y(\theta)$ derived from the shape waveform data $r(\theta)$ stored in the memory (RAM) 48. Alternatively, the shape waveform may be calculated in real time, and the irradiation position may be adjusted in real time. That is, the shape waveform data $r(\theta)$ during recording (beam exposure) of irradiating the electron beam to the substrate is calculated. Using the resulting shape waveform data $r(\theta)$, the rotation runout waveform data $x(\theta)$ and $y(\theta)$ is calculated in real time, for adjusting the irradiation position of the electron beam.

Figure 10:
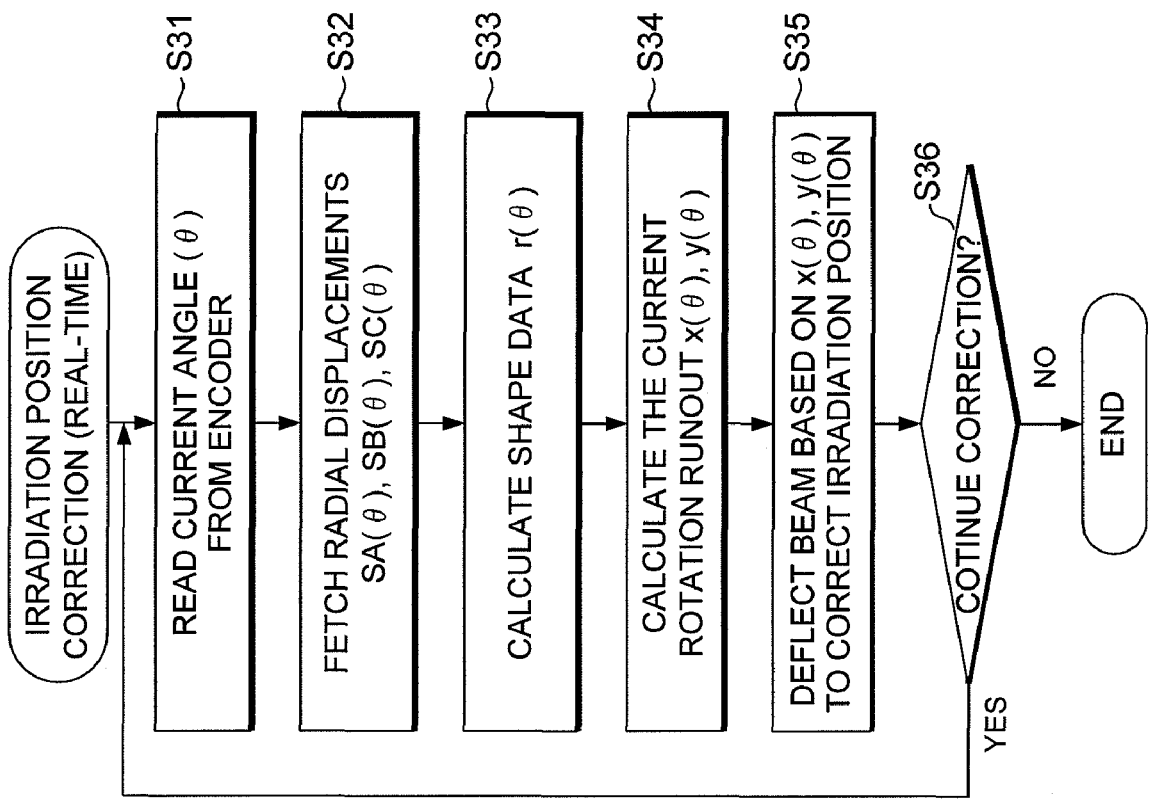
FIG. 10 is a flowchart showing the procedure in which the shape waveform data $r(\theta)$ is calculated when performing recording (exposure) to perform real-time correction.

FIG. 10 shows a flowchart when performing real-time correction. The current angle ($\theta$) is read out from the rotary encoder 46 (step S31). The current displacements $SA(\theta)$, $SB(\theta)$, and $SC(\theta)$ are fetched from the displacement sensors 41A, 41B, and 41C (step S32). Then, the shape waveform data $r(\theta)$ is calculated (step S33).

The current rotation runout $x(\theta)$ and $y(\theta)$ are calculated by the rotation runout computing unit 43 (step S34). The controller 30 adjusts beam deflection based on the rotation runout $x(\theta)$ and $y(\theta)$ (step S35) to perform real-time correction.

When it is determined that the correction control is continued, the procedure steps are repeated from step S31 (step S36).

Figure 7:
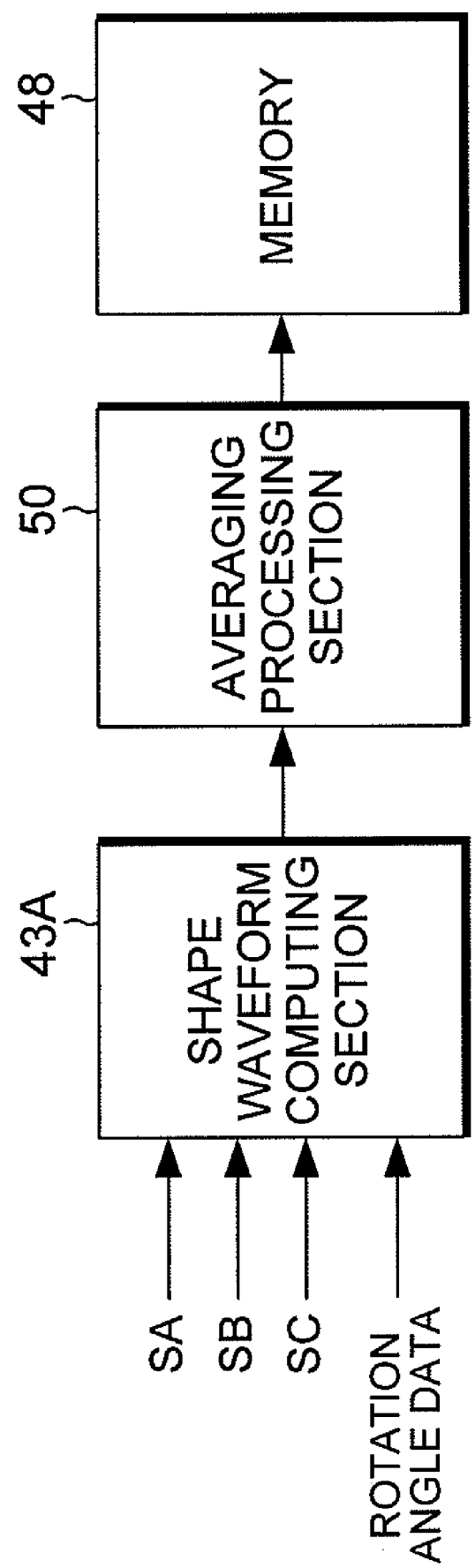
FIG. 7 is a block diagram showing the configuration in a case where the beam irradiation position is corrected for an exposure beam while the shape waveform data $r(\theta)$ is being updated in real time during beam exposure.

Still alternatively, the shape waveform data $r(\theta)$ may be updated while the shape waveform is being calculated in real time. That is, as shown in FIG. 7, for example, a shape waveform computing section 43A may calculate the shape waveform data $r(\theta)$ in real time during beam exposure, and forwards the result to an averaging processing section 50. The averaging processing section 50 updates the shape waveform data $r(\theta)$ as appropriate. As an example, the moving average computation is performed for the shape waveform data $r(\theta)$ for a plurality of rotations, and using the resulting shape waveform data, the shape waveform data $r(\theta)$ for storage into the memory (RAM) 48 is updated as appropriate. For example, the averaging processing section 50 performs control in such a manner that the shape waveform data $r(\theta)$ in storage is updated for every rotation.

Figure 5:
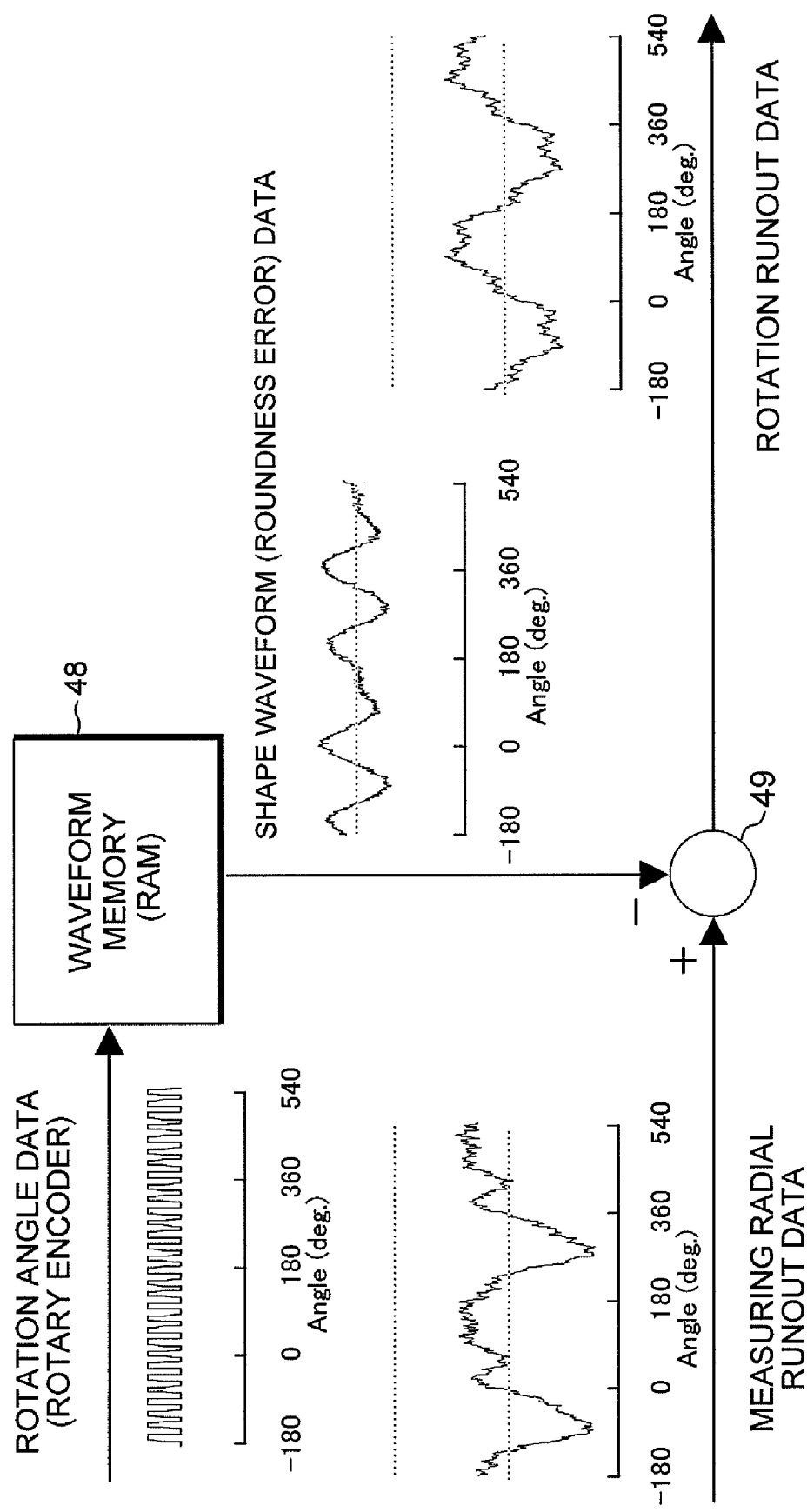
FIG. 5 is a diagram for illustrating the operation of a rotation runout computing unit being in charge of adjusting, during beam exposure, the beam irradiation position based on shape waveform data $r(\theta)$.

As shown in FIG. 5, the rotation runout computing unit 43 uses the average shape waveform data $r(\theta)$ updated in real time during beam exposure to calculate the rotation runout waveform data $x(\theta)$ and $y(\theta)$, and forwards the result to the controller 30.

With the configuration of updating the shape waveform data $r(\theta)$ in real time as such, recording-position correction control having little error can be performed, even if the shape waveform of the measuring cross section of the turntable shows some change according to temperature change, for example. Accordingly, long-time high-accuracy beam exposure or recording can be performed.

The present invention can be applied to high recording-density recording medium or hard disk, for example, discrete track medium or patterned medium. In such applications, the rotation runout can be corrected and recording medium or hard disk having a recording track with high roundness can be manufactured. Generally, since a servo mechanism corresponding to the tracking-servo technology usually used for optical disc is not used for the recording/reproducing head for the hard disc, a disc having a higher track roundness leads to an improved S/N (signal to noise ratio) in reproduction.

A description will be made for a high-density magnetic recording medium manufactured by an electron beam recording apparatus according to the present invention. A description will be made taking a patterned medium having a disc shape as an example.

Figure 11:
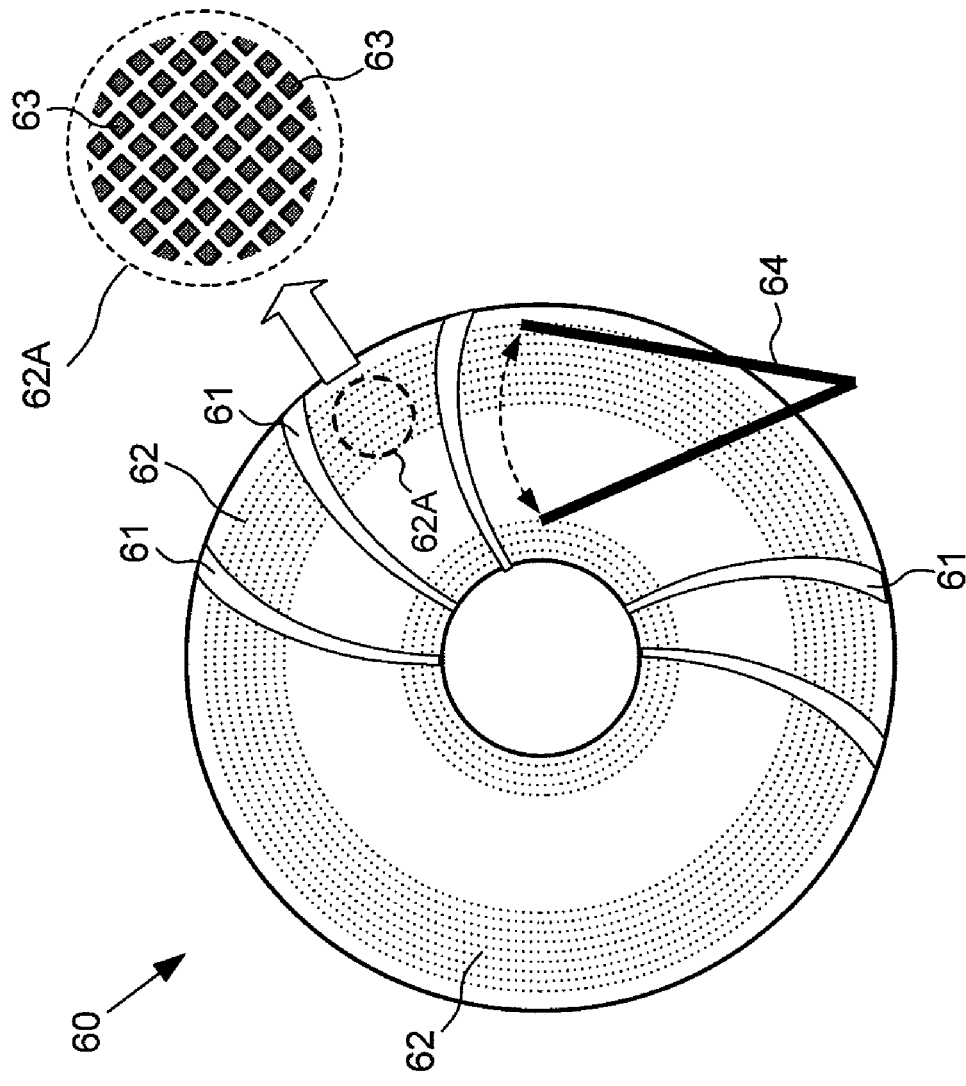
FIG. 11 is a drawing schematically illustrating a configuration of a patterned magnetic recording disc.

As shown in FIG. 11, a patterned magnetic recording disc 60, which is called as a patterned medium, includes a servo pattern portion 61 and a patterned data track portion 62. Note that dot patterns or dots are illustrated only in inner radius portion and outer radius portion of the disc in FIG. 11. However, the dot patterns are illustrated merely schematically in FIG. 11 and the dot patterns are formed over the entire effective radius of the disc. Additionally, the servo pattern portions 61 are exemplary illustrated in FIG. 11, and the servo pattern portion 61 other than those illustrated can be formed.

Additionally, an enlarged view of part 62A of the data track portion 62 is also illustrated in FIG. 11. On the data track portion 62, a sequence of magnetic substance (or material) dots 63 is formed, in which the magnetic dots 63 are arranged concentrically. There are formed a rectangular pattern which represents address information or track detection information, and a line-shape pattern for extraction of clock timing, the line-shape pattern extending in the direction crossing the track. A swing arm head 64 is used for data writing and data recording.

Here, although the servo pattern portion 61 is shown to have arrangements as a current hard disc medium, a new servo pattern portion which is optimized for a patterned medium can be adopted. The new servo pattern portion may have a pattern shape and arrangement different from those of the current hard disc medium.

The patterned recording medium including, for example, the patterned magnetic recording disc 60, can be manufactured by etching the recording material (e.g., magnetic material) using the resist mask as an etching mask, the resist mask being formed by the drawing (recording) and exposure using the above-described electron beam recording apparatus of the present invention. However, since the manufacturing efficiency is not high when using this method, it is preferable to employ an imprint lithography method in manufacturing the patterned magnetic recording medium.

Description will now be made, with reference to FIG. 12, for manufacturing method of the patterned magnetic recording medium in which a master (also, referred to as a mold) manufactured using the above-described electron beam recording apparatus is used as an imprint lithography mold (hereinafter, simply referred to as an imprint mold) 70.

Specifically, the patterned recording medium using the imprint mold is advantageous for ultra-fine pattern corresponding to the surface density exceeding 500 Gbpsi (Gbits/inch$^2$), particularly, for extremely high surface density of 1 to 10 Tbpsi. More specifically, for example, using an imprint mold having a pattern of pit intervals of approximately 25 nm (nanometer), a high-density patterned recording medium having a recording density of approximately 1 Tbpsi can be manufactured.

Figure 12:
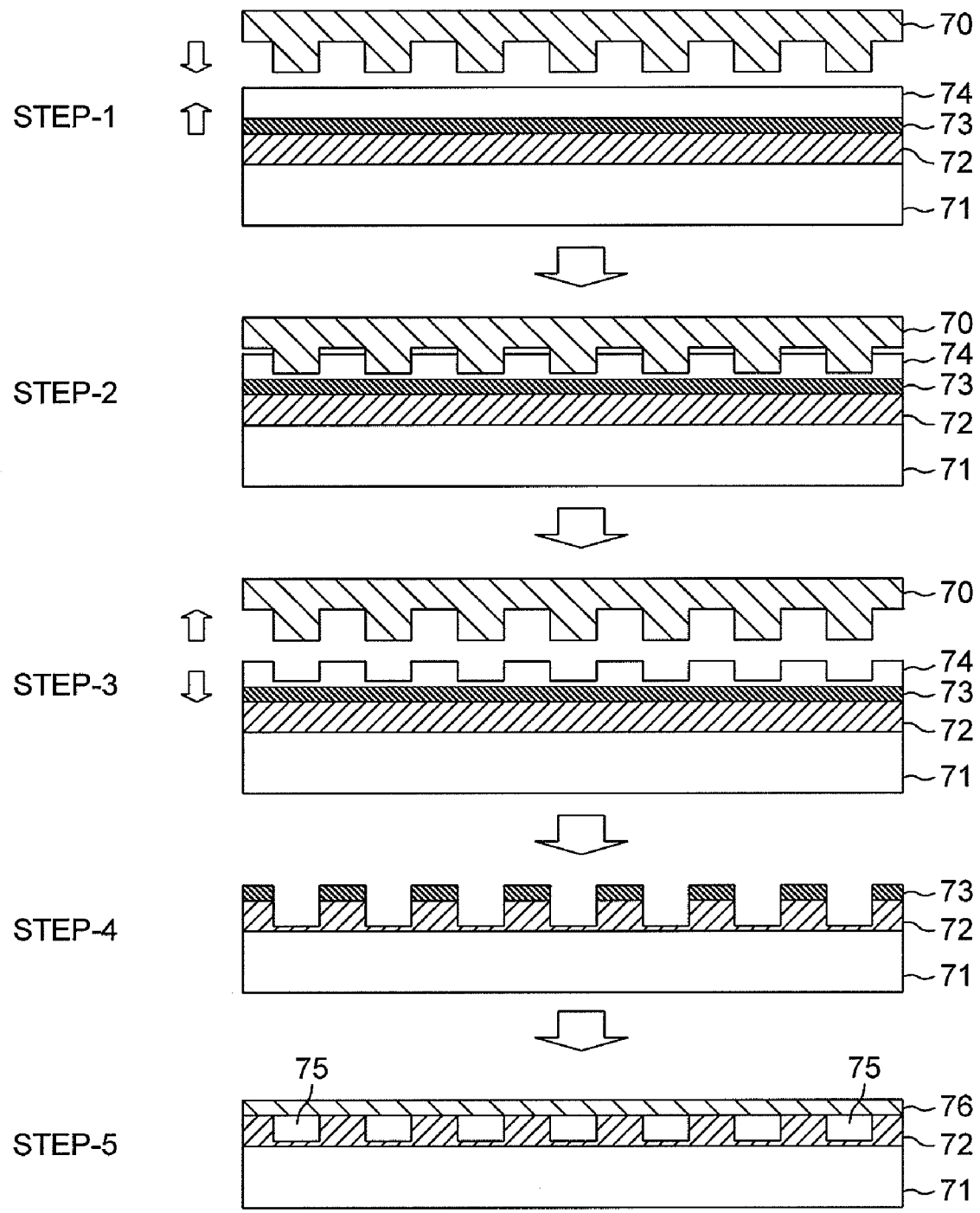
FIG. 12 is a drawing showing the process steps for manufacturing method of the patterned recording medium in which an imprint mold is used, the imprint mold being manufactured using the electron beam recording apparatus of the present invention.

As shown in FIG. 12, a recording layer 72, a metal mask layer 73 and an imprint mold material layer 74 are formed in this order on a base substrate 71 for recording medium which is made of Si wafer or reinforced glass and the like. The recording layer 72 is formed by depositing magnetic material using, for example, a sputtering method. When manufacturing a vertical magnetic recording medium, the recording layer 72 has a stacked structure in which a soft magnetic material layer, an intermediate layer and a ferromagnetic material layer is stacked in this order.

The metal mask layer 73 is formed on the recording layer (i.e., magnetic material layer) 72. The metal mask layer 73 is made of, for example, Ta (tantalum) or Ti (titanium) formed by a sputtering method, for example. On the metal mask layer 73, a resist layer of thermoplastic resin is formed by, for example, a spin-coat method, as the imprint material layer 74. The imprint mold 70 is arranged such that the imprint surface having pits and projections thereof is opposed to the imprint material layer 74 (FIG. 12, STEP-1).

Then, the imprint material layer 74 is heated so as to have fluidity as needed. After that, the imprint mold 70 is pressed onto the imprint material layer 74 (STEP-2).

In the next step, the imprint mold 70 is taken off from the imprint material layer 74 to imprint the pattern of pits and projections of the imprint mold 70 (STEP-3).

The unnecessary imprint material remaining in the pit portions of the imprint material layer 74 is removed by, for example, an ashing method. The metal mask layer 73 is subject to patterning processing using the remained imprint material as a patterning mask. Then, the recording layer (i.e., magnetic material layer) 72 is subject to patterning processing, for example, a dry etching processing, using the patterned metal mask layer 73 as a patterning mask (STEP-4).

The pits (depressed portions) in the recording layer 72 formed by the patterning processing are buried by non-magnetic material and the surface thereof is flattened. With the processings, the patterned structure is formed wherein the recording material (i.e., magnetic material) is separated by the non-magnetic material (STEP-5). Additionally, a protection film 76 is formed on the surface to complete the patterned recording medium.

As described above in detail, a high-density recording medium such as a discrete track medium and a patterned medium can be manufactured by using the above-described beam recording apparatus of the present invention.

What is claimed is:

1. An electron beam recording apparatus for emitting an electron beam toward a substrate while rotating a turntable with the substrate placed thereon, the recording apparatus comprising:
   a displacement detection unit including at least three displacement sensors disposed at each different angle in a radial direction of the turntable;
   a shape calculation unit for calculating, based on the detected displacements by the at least three displacement sensors, shape data corresponding to displacements of side surface of the turntable in the radial directions when performing electron beam recording;
   a rotation runout computing unit for computing, based on the shape data and at least one displacement detected by the at least three displacement sensors, rotation runout of the turntable including a rotation asynchronous component and a rotation synchronous component by subtracting only a roundness error of the shape of the side surface of the turntable; and
   a beam irradiation position adjustment unit for adjusting an irradiation position of the electron beam based on the rotation runout.

2. The electron beam recording apparatus according to claim 1, wherein
   the shape calculation unit calculates the shape data based on a three-point roundness measurement method.

3. The electron beam recording apparatus according to claim 1, wherein the turntable is placed on a stage, and at least one of the at least three displacement sensors is disposed in the transfer direction of the stage.

4. The electron beam recording apparatus according to claim 3, wherein
   the displacement detection unit includes four displacement sensors, and one of the four displacement sensors is disposed in a direction orthogonal to the displacement sensor disposed in the transfer direction.

5. The electron beam recording apparatus according to claim 1, further comprising a memory for storing the shape data, wherein the rotation runout computing unit computes the rotation runout based on the shape data stored in the memory.

6. The electron beam recording apparatus according to claim 1, further comprising:
   an averaging processing section for averaging the shape data by rotating the turntable for a plurality of times, wherein
   the rotation runout computing unit computes the rotation runout based on the averaged shape data.

7. The electron beam recording apparatus according to claim 1, further comprising:
   a shape data update section for updating the shape data.

8. A computing method of a rotation runout in an electron beam recording apparatus for emitting an electron beam toward a substrate while rotating a turntable with the substrate placed thereon, the method comprising:
   a displacement detecting step of detecting displacements in at least three different angles in radial directions of the turntable;
   a shape calculating step of calculating, based on the detected displacements in the at least three different angles, shape data corresponding to displacements of side surface of the turntable; and
   a rotation runout computing step of computing, based on the shape data and at least one displacement of the at least three different angles rotation runout of the turntable including a rotation asynchronous component and a rotation synchronous component by subtracting only a roundness error of the shape of the side surface of the turntable.

9. The method according to claim 8, wherein
   the shape calculating step calculates the shape data based on a three-point roundness measurement method.

10. The method according to claim 8, wherein the turntable is placed on a stage, and at least one of the at least three different angles is the transfer direction of the stage.

11. The method according to claim 10, wherein
    a displacement detecting step detects four displacements in the directions different from each other, and one of the four displacements is a displacement in a direction orthogonal to the transfer direction.

12. The method according to claim 8, further comprising a storing step of storing the shape data, wherein the rotation runout computing step computes the rotation runout based on the shape data stored in the storing step.

13. The method according to claim 8, further comprising an averaging processing step of averaging the shape data by rotating the turntable for a plurality of times, wherein
    the rotation runout computing step computes the rotation runout based on the averaged shape data.

14. The method according to claim 8, further comprising a shape data update step of updating the shape data.

15. A method of adjusting the electron beam using the method according to claim 8, wherein,
    a beam irradiation position adjusting step of adjusting an irradiation position of the electron beam based on the rotation runout.

* * * * *